United States Patent
Tatman et al.

(10) Patent No.: US 7,924,984 B2
(45) Date of Patent: Apr. 12, 2011

(54) METHOD AND SYSTEM FOR DETERMINING PHYSICAL LOCATION OF EMERGENCY SERVICE CALLERS ON A PACKET SWITCHED NETWORK

(75) Inventors: Lance A. Tatman, Granite Bay, CA (US); Jeffrey P. Jones, Los Gatos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1202 days.

(21) Appl. No.: 11/553,947

(22) Filed: Oct. 27, 2006

(65) Prior Publication Data

US 2008/0101551 A1    May 1, 2008

(51) Int. Cl.
*H04M 11/00* (2006.01)

(52) U.S. Cl. .............. 379/45; 379/37; 370/352

(58) Field of Classification Search .......... 379/45, 379/37–44, 46–51; 370/352, 469, 329, 339, 370/356, 401; 455/404.1, 404.2, 456.1, 414.1
See application file for complete search history.

(56) References Cited

U.S. PATENT DOCUMENTS

| | | | |
|---|---|---|---|
| 7,336,968 B2 * | 2/2008 | Diroo et al. | 370/469 |
| 2003/0133450 A1 * | 7/2003 | Baum | 370/389 |

* cited by examiner

*Primary Examiner* — Melur Ramakrishnaiah

(57) ABSTRACT

Pluggable communication modules, e.g. SFP, XFP, XENPAK, on a service provider's packet switched network will include network monitoring capability, e.g. Intelligent Pluggable Modules. The Intelligent Pluggable Modules are configured to detect emergency calls. When an emergency call is detected, the module notifies a software application of the detected call, including the Media Access Controller (MAC) address of the caller. The application then queries the network equipment, typically the Digital Subscriber Line Access Multiplexer for the ingress port of the MAC address using a protocol such as SNMP. Upon receipt, the service provider's customer database is then queried for the physical port location corresponding to the MAC address. The management station then sends the physical location into the existing 911 system.

16 Claims, 2 Drawing Sheets

METHOD AND SYSTEM FOR DETERMINING PHYSICAL LOCATION OF EMERGENCY SERVICE CALLERS ON A PACKET SWITCHED NETWORK

BACKGROUND

Voice Over Internet Protocol (VoIP) phones and VoIP service providers provide consumers the flexibility to take their phone service with them and use it on any provider's broadband network. This flexibility causes problems when the consumer requires emergency services, e.g. 911. As the consumer's location is unknown, the emergency services are often delayed. Death may result from the lack of location information and the related delays.

SUMMARY

Pluggable communication modules, e.g. SFP, XFP, XEN-PAK, on a service provider's packet switched network will include network monitoring capability, e.g. Intelligent Pluggable Modules. The Intelligent Pluggable Modules are configured to detect emergency calls. When an emergency call, e.g. 911, is detected, the module notifies a software application of the detected call, including the Media Access Controller (MAC) address of the caller. The application then queries the network equipment, typically the Digital Subscriber Line Access Multiplexer (DSLAM) for the ingress port of the MAC address using a protocol such as SNMP. Upon receipt, the service provider's customer database is then queried for the street address of the physical port location corresponding to the MAC address. The management station then sends the physical location into the existing 911 system.

DETAILED DESCRIPTION

Interface converters used in digital networks may be small pluggable modules which convert signals from one form to another, such as from optical to electrical and are made in several different form factors. One such form factor, the GBIC (Giga Bit Interface Converter), bidirectionally converts signals to and from electrical and electrical or optical form, connecting twisted pair copper cables or fiber optic cables to devices such as switches, and routers. Many of these pluggable interface modules provide digital diagnostic information on a special two wire slow-speed electrical port, commonly known as an I2C interface. The industry-standard SFF-8472, a diagnostic monitoring interface for optical transceivers, provides for a diagnostics standard including parameters such as optical transmit and receive power, voltage and temperature measurement, vendor identification, optical wavelength, serial number, and other factory parameters.

While these modules provide information on internal operation, this information is either only available locally, or through added interfaces in the switch or router. Improved diagnostic or information capabilities in these pluggable modules cannot be accessed unless and until they are supported by the myriad of devices which may host them. The following references:

U.S. application Ser. No. 10/407,517, "Passive Measurement Platform"

U.S. application Ser. No. 10/407,719, "Assisted Port Monitoring With Distributed Filtering"

U.S. application Ser. No. 10/688,340, "Creating a Low Bandwidth Channel Within a High Bandwidth Packet Stream"

disclose a suitable pluggable media. These references are incorporated herein. These references provide for a pluggable module with full access to the data stream, a means of sending results back over the network connection, and some amount of computing capability. Alternatively, the data inspection and diagnostic or information capabilities may be part of an external device, e.g. deep packet inspection box, that is inserted in the system or may be integrated into the network device, e.g. switch or router.

Figure 1:
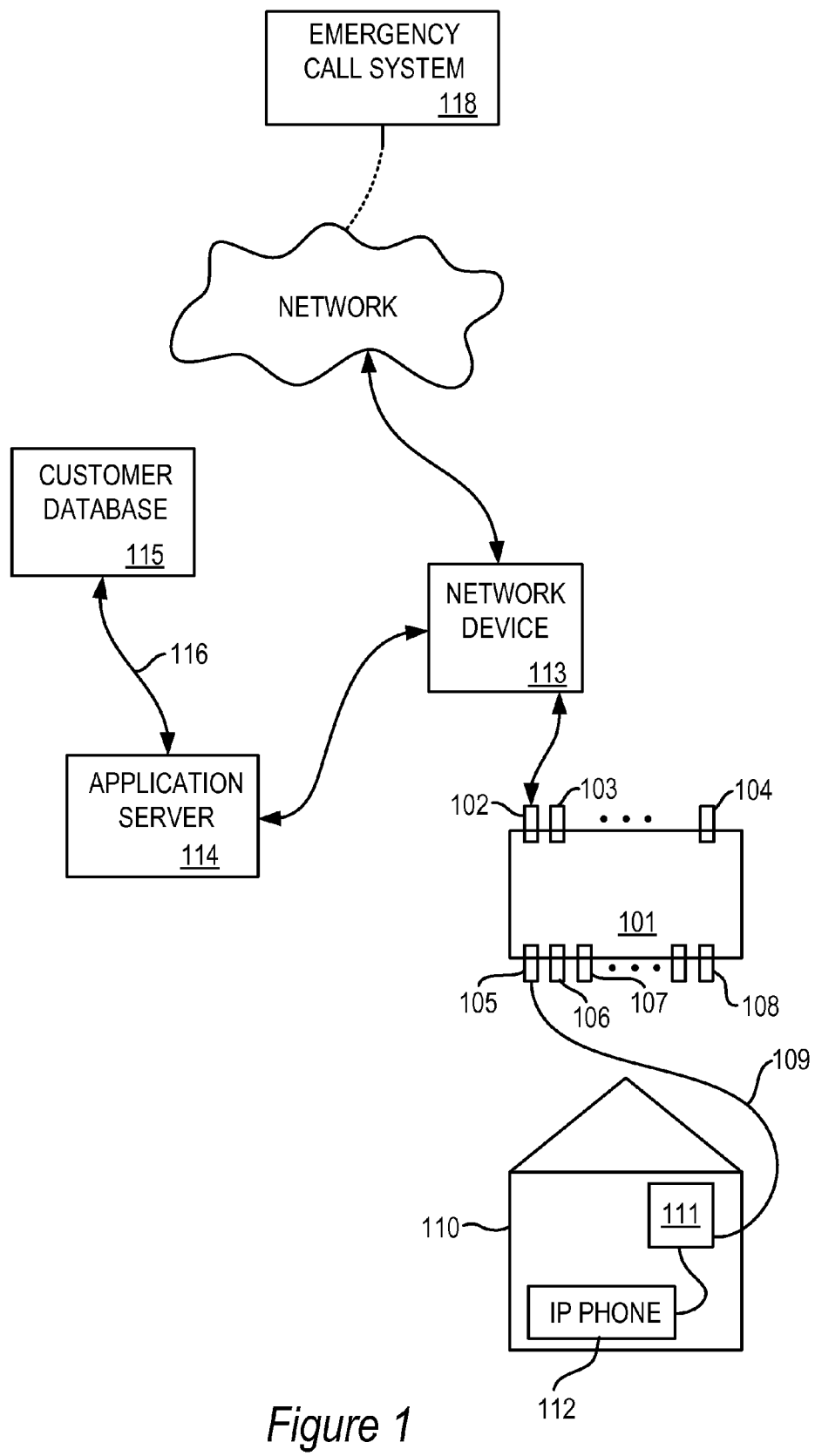
FIG. 1 illustrates an embodiment of the invention.

FIG. 1 illustrates an embodiment of the invention. A call is placed to emergency services from building 110, e.g. house, using an internet protocol (IP) phone 112. The call passes through DSL modem 111 and across link 109 where it enters Digital Subscriber Line Access Multiplexer (DSLAM) 101 via DSL circuit 105 and exits via the intelligent optical module 102. The service provider configures the intelligent optical modules, 102, 103, 104 to watch for calls to emergency services 118 and to notify application server 114 with the unique call ID of an emergency call, and the Media Access Control (MAC) address of the IP phone from which the emergency call was made, when a probe of the intelligent optical module 102 detects the emergency call. Once the application server has been notified with the unique call ID and MAC address, it queries the DSLAM for the physical DSL circuit associated with the MAC address of IP phone 112. It may make this query using common management protocols such as Simple Network Management Protocol (SNMP) or some other automated process. Once application server 114 obtains the specific DSL circuit information, it then initiates a query to customer database 115 for the street address corresponding to the DSL circuit. Upon receipt of this information, application server 114 forwards a message to emergency call system 118. This message will contain the unique call ID as well as the street address obtained from customer database 115.

Figure 2:
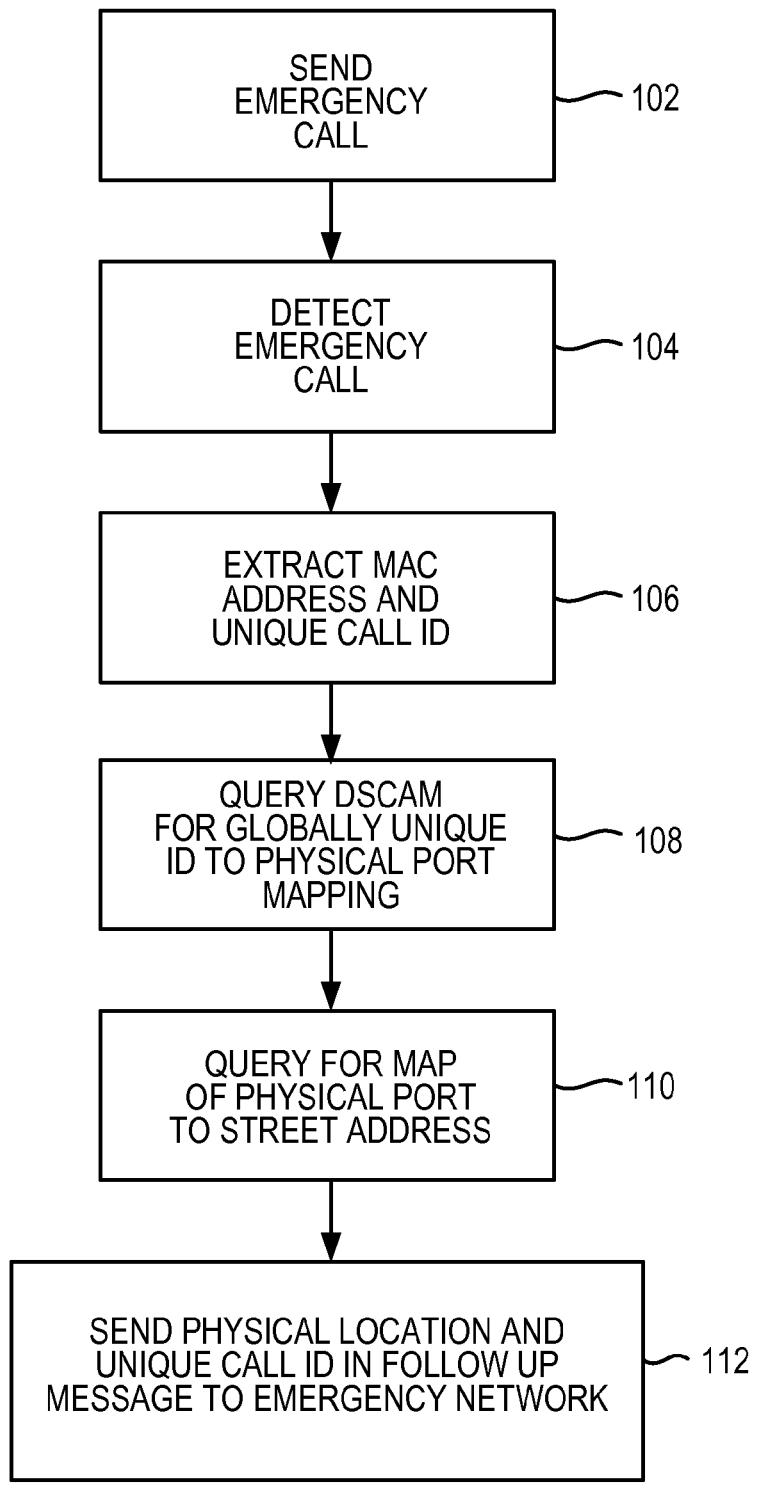
FIG. 2 illustrates a process flowchart corresponding to the invention.

FIG. 2 illustrates a process flowchart corresponding to the invention.

In step 102, an emergency call is sent on a broadband network.

In step 104, the pluggable media detects the emergency call.

In step 106, the pluggable media extracts the globally unique identifier, e.g. Media Access Control address, and unique call ID. The MAC address is a unique identifier attached to most forms of networking equipment. Most layer 2 network protocols use one of three numbering spaces managed by the IEEE: MAC-48, EUI-48, and EUI-64, which are designed to be globally unique.

In step 108, the application queries the DSLAM for the globally unique identifier to physical port mapping.

In step 110, the application queries the customer database to map the physical port to a residential or street address.

In step 112, the pluggable media sends the physical location and unique call ID into the existing 911 system as a follow up message to the emergency call.

We claim:

1. A method comprising:
   transmitting a call on an internet protocol IP network, the call including a unique call ID;

detecting the call by a diagnostic module and determining it is an emergency call;

extracting a globally unique identifier and unique call ID;

transmitting the globally unique identifier and unique call ID to a waiting application querying a network device for the globally unique identifier to physical port mapping;

querying a customer database to map the physical port to an address; and transmitting a follow-up call into an emergency alert system that includes the address and unique call identifier.

2. A method, as defined in claim 1, wherein the diagnostic module is a pluggable media.

3. A method, as defined in claim 2, wherein the pluggable media is an interface converter including diagnostic monitoring.

4. A method, as defined in claim 1, wherein the diagnostic module is a box capable of inspecting the data stream and identifying emergency calls, call ID and unique global identifier and is also capable of network communications.

5. A method, as defined in claim 1, wherein the box is a deep packet inspection box.

6. A method, as defined in claim 1, wherein the diagnostic module is built into the network device.

7. A method as, defined in claim 6, wherein the network device is selected from a group including a switch and a router.

8. A method, as defined in claim 1, wherein the globally unique identifier is selected from a group that includes MAC-48, EUI-48, and EUI-64 addresses.

9. A system comprising:

a modem transmitting a call having a unique call identifier;

a Digital Subscriber Line Access Multiplexer receiving the call from the modem and transmitting the call;

a network device receiving the call from the digital subscriber line access multiplexer and transmitting the call into an emergency call network;

an application server electrically connecting the network device;

a diagnostic module, detecting the call, recognizing the call as an emergency call, and transmitting the unique call identifier and a globally unique identifier to the application server;

the application server including, querying the network device for the globally unique identifier to physical port mapping, querying a customer database to map the physical port to an address, and transmitting a follow-up message into an emergency alert system that includes the address and unique call identifier; and an Internet protocol network electrically connecting the modem, the Digital Subscriber Line Access Multiplexer, the network device, the diagnostic module, and the application server.

10. A system, as defined in claim 9, the diagnostic module including pluggable media.

11. A system, as defined in claim 10, wherein the pluggable media is an interface converter including diagnostic monitoring.

12. A system, as defined in claim 9, wherein the diagnostic module is a box capable of inspecting the data stream and identifying emergency calls, call ID and unique global identifier and is also capable of network communications.

13. A system, as defined in claim 12, wherein the box is a deep packet inspection box.

14. A system, as defined in claim 9, wherein the diagnostic module is built into the network device.

15. A system, as defined in claim 14, wherein the network device is selected from a group including a switch and a router.

16. A system, as defined in claim 9, wherein the globally unique identifier is selected from a group that includes MAC-48, EUI-48, and EUI-64 addresses.

* * * * *